(12) United States Patent
Fagerlund et al.

(10) Patent No.: US 9,291,282 B2
(45) Date of Patent: Mar. 22, 2016

(54) SWEPT OUTLET NOISE REDUCING ELEMENT

(71) Applicant: FISHER CONTROLS INTERNATIONAL LLC, Marshalltown, IA (US)

(72) Inventors: Allen C. Fagerlund, Marshalltown, IA (US); Daniel J. Eilers, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 136 days.

(21) Appl. No.: 14/095,134

(22) Filed: Dec. 3, 2013

(65) Prior Publication Data
US 2015/0152976 A1 Jun. 4, 2015

(51) Int. Cl.
*F16K 3/32* (2006.01)
*F16K 47/08* (2006.01)
*F16K 3/24* (2006.01)

(52) U.S. Cl.
CPC .. *F16K 47/08* (2013.01); *F16K 3/24* (2013.01)

(58) Field of Classification Search
USPC .......................................... 137/625.3, 625.37
See application file for complete search history.

(56) References Cited

U.S. PATENT DOCUMENTS

| | | | | |
|---|---|---|---|---|
| 3,688,800 A | * | 9/1972 | Hayner et al. | 138/42 |
| 3,921,668 A | * | 11/1975 | Self | 137/625.3 |
| 3,971,411 A | * | 7/1976 | Baumann | 137/625.3 |
| 4,127,146 A | | 11/1978 | Self | |
| RE32,197 E | * | 7/1986 | Self | 251/127 |
| 5,941,281 A | * | 8/1999 | Baumann et al. | 137/625.33 |
| 6,161,584 A | * | 12/2000 | Hemme et al. | 137/625.37 |
| 6,935,370 B2 | * | 8/2005 | McCarty et al. | 137/625.3 |
| 7,195,034 B2 | | 3/2007 | Shea | |
| 7,766,045 B2 | * | 8/2010 | Fagerlund | F16K 47/08 137/625.3 |
| 8,430,131 B2 | | 4/2013 | Fagerlund et al. | |
| 8,826,938 B2 | * | 9/2014 | Moore | 137/625.37 |

OTHER PUBLICATIONS

Flowserve Gaseous Noise Control Catalogue, 20 pages, 2007.

* cited by examiner

*Primary Examiner* — John Fox
(74) *Attorney, Agent, or Firm* — Marshall, Gerstein & Borun LLP (57) ABSTRACT

A stackable noise attenuating disk includes an inner perimeter edge and an outer perimeter edge. A plurality of inlet passages is disposed along the inner perimeter edge and a plurality of outlet passages disposed along the outer perimeter edge. The plurality of outlet passages includes first outlet passages having a first width and second outlet passages having a second width, which is greater than the first width. Each of the plurality of outlet passages defines a longitudinal axis that is offset by a predetermined angle from a radial axis extending through a corresponding outlet passage. The plurality of inlet passages and the plurality of outlet passages are arranged such that fluid entering one of the plurality of inlet passages exits through at least one of the plurality of outlet passages.

21 Claims, 6 Drawing Sheets

SWEPT OUTLET NOISE REDUCING ELEMENT

FIELD OF THE DISCLOSURE

This disclosure relates generally to noise reducing devices such as stacked disk vent diffusers and valve cages having a plurality of outlet passages.

BACKGROUND

In typical control valves, a valve cage may provide guidance for a valve plug as the valve plug moves from a closed position in which the valve plug sealingly engages a valve seat to an open position in which the valve plug is disposed away from the valve seat. When the valve is in the open position, fluid flows from a valve inlet, passes through a passage between the valve seat and the valve plug, passes through the valve cage, and exits through a valve outlet. Valve cages can be comprised of an assembly of a plurality of disks that are arranged in a vertical stack. The disks generally have a plurality of inlet passages, at least one plenum section, and a plurality of outlet passages. In such disks, fluid enters the inlet passages, passes through the plenum sections of adjacent disks, and exits through the outlet passages. In such stacked disk valve cages, fluid exiting the outlet passages can create high noise levels that can be capable of permanently damaging the hearing of persons working close to the control valve.

Stacked disks, such as those described above, may also be used in a vent diffuser to reduce the pressure of fluid, such as steam, exiting the diffuser to the atmosphere. As discussed above, in such stacked disk vent diffusers, fluid exiting the outlet passages can create high noise levels.

To reduce the overall noise level of the fluid exiting the valve cage or vent diffuser, a common practice is to break up flow jets into the smallest possible independent jets. Breaking up the flow jets in this manner shifts the frequency of the noise generated by fluid exiting the valve cage, which can be shifted to a range that is near to or above the range that can be sensed by the human ear. The smaller the size of the outlet passage, the greater the apparent attenuation due to the shift of the noise. However, the smaller the size of each outlet passage, the greater the number of outlet passages that are necessary to handle the fluid passing through the valve cage. Consequently, increasing the number of outlet passages increases manufacturing costs.

In addition to breaking up the flow jets, the outlet passages can also be made of two or more different widths, which allows the outlet passages to cooperate to shift the noise peak frequencies of the fluid exiting the passages. However, even using identical stacked disks having outlet passage of different widths, the stacked disks still form a vertical pattern of outlet passages in close proximity that all exhaust in the same direction when stacked together. In this vertical pattern, the exiting jets can combine in a vertical manner since they are all aligned and exhausting in the same direction causing flow/pressure tones that lead to higher noise levels detectable in the human audio range.

BRIEF SUMMARY OF THE DISCLOSURE

In accordance with one exemplary aspect of the present invention, a stackable noise attenuating disk includes an inner perimeter edge and an outer perimeter edge. A plurality of inlet passages are disposed along the inner perimeter edge and a plurality of outlet passages are disposed along the outer perimeter edge. The plurality of outlet passages include a plurality of first outlet passages having a first width and a plurality of second outlet passage having a second width, which is greater than the first width. Each of the plurality of outlet passages defines a longitudinal axis that is offset by a predetermined angle from a radial axis extending through a corresponding outlet passage. The plurality of inlet passages and the plurality of outlet passages are arranged such that fluid entering one of the plurality of inlet passages exits through at least one of the plurality of outlet passages.

In accordance with another exemplary aspect of the present invention, a vent diffuser includes an elongated hollow pipe having a flange at the end, an impermeable end plate coupled to the flange, and a plurality of stacked disks having at least two disks between the flange and the end plate. Each of the stacked disks includes an inner perimeter edge and an outer perimeter edge. A plurality of inlet passages are disposed along the inner perimeter edge and a plurality of outlet passages are disposed along the outer perimeter edge. The plurality of outlet passages include a plurality of first outlet passages having a first width and a plurality of second outlet passage having a second width, which is greater than the first width. Each of the plurality of outlet passages defines a longitudinal axis that is offset by a predetermined angle from a radial axis extending through a corresponding outlet passage. The plurality of inlet passages and the plurality of outlet passages are arranged such that fluid entering one of the plurality of inlet passages exits through at least one of the plurality of outlet passages.

In accordance with another exemplary aspect of the present invention, a control valve includes a housing having an inlet and an outlet. A valve seat is disposed within the housing between the inlet and the outlet. A valve plug is vertically displaceable from a first position in which the valve plug sealingly engages the valve seat to a second position in which the valve plug is remotely disposed from the valve seat. A valve cage is disposed within the housing adjacent to the valve seat such that the valve cage surrounds the valve plug. The valve cage includes a plurality of stacked disks having at least two disks and each of the plurality of stacked disks includes an inner perimeter edge and an outer perimeter edge. A plurality of inlet passages are disposed along the inner perimeter edge and a plurality of outlet passages are disposed along the outer perimeter edge. The plurality of outlet passages include a plurality of first outlet passages having a first width and a plurality of second outlet passage having a second width, which is greater than the first width. Each of the plurality of outlet passages defines a longitudinal axis that is offset by a predetermined angle from a radial axis extending through a corresponding outlet passage. The plurality of inlet passages and the plurality of outlet passages are arranged such that fluid entering one of the plurality of inlet passages exits through at least one of the plurality of outlet passages.

In further accordance with any one or more of the foregoing exemplary aspects of the present invention, a stackable noise attenuating disk and associated vent diffusers and control valves may further include, in any combination, any one or more of the following preferred forms.

In one preferred form, the predetermined angle is preferably 15 degrees.

In another preferred form, the plurality of outlet passages include a plurality of third outlet passages having a third width, greater than the second width.

In another preferred form, each of the plurality of first outlet passages and the plurality of second outlet passages are defined by a first lateral edge, a second lateral edge, and a circumferential inner edge, where the first lateral edge and the second lateral edge of each of the plurality of first outlet passages and the plurality of second outlet passages have the same length.

In another preferred form, the first lateral edge and the second lateral edge of each of the plurality of first outlet passages and the plurality of second outlet passages are parallel to the corresponding longitudinal axis.

In another preferred form, the first lateral edge and the second lateral edge of each of the plurality of first outlet passages is separated by a first angular dimension, which is the first width and the first lateral edge and the second lateral edge of each of the plurality of second outlet passages is separated by a second angular dimension, which is the second width.

In another preferred form, the plurality of first outlet passages and the plurality of second outlet passages cooperate to shift the noise peak frequencies of fluid exiting the plurality of outlet passages, thereby reducing the overall noise level of fluid exiting the plurality of outlet passages.

In another preferred form, the disk includes one or more outlet groups and each of the one or more outlet groups includes at least one first outlet passage, at least one second outlet passage, and at least one third outlet passage.

In another preferred form, the disk includes a first plenum section, a second plenum section, a third plenum section, and an aperture. The first plenum section is positioned adjacent the inner perimeter edge and outwardly offset in a radial direction from the inner perimeter edge such that the first plenum section is in fluid communication with at least one inlet passage of one or more adjacent disks comprising a first stage. The second plenum section is outwardly offset in a radial direction from the inner perimeter edge such that the second plenum section is in fluid communication with at least one first plenum section of the one or more adjacent disks comprising a second stage. The aperture is outwardly offset in a radial direction from the first plenum section such that the aperture is in fluid communication with at least one second plenum section of the one or more adjacent disks. The third plenum section is offset in a radial direction from the aperture and the outlet passages such that the third plenum section is in fluid communication with an aperture and an outlet passage of the one or more adjacent disks comprising a third stage.

In another preferred form, fluid entering at least one of the plurality of inlet passages flows through a first plenum section of one or more adjacent disks, through the second plenum section, through an aperture of the one of more adjacent disks, and through the third plenum section, to exit through one or more outlet passage of the one more adjacent disks.

In another preferred form, fluid entering an inlet passage of one or more adjacent disks flows through the first plenum section, through a second plenum section of the one or more adjacent disks, through the aperture, and through a third plenum section of the one or more adjacent disks, to exit through at least one of the plurality of outlet passages.

In another preferred form, the disk includes at least one second inlet passage extending from an outer edge of the first plenum section to provide the fluid communication between the first plenum section and the at least one second plenum section of the one or more adjacent disks.

In another preferred form, the plurality of stacked disks includes a first disk, a second disk, a third disk, and a fourth disk. The second disk is positioned adjacent the first disk and is oriented such that the second disk is rotated 180 degrees about a vertical axis relative to the first disk. The third disk is positioned adjacent the second disk and is oriented such that the third disk is rotated 180 degrees about a first horizontal axis relative to the first disk. The fourth disk is positioned adjacent the third disk and is oriented such that the fourth disk is rotated 180 degrees about a second horizontal axis, perpendicular to the first horizontal axis, relative to the first disk.

DETAILED DESCRIPTION

An example noise and fluid pressure reduction device is shown in FIGS. 1-7. The example device uses an assembly of stacked of annular disks to provide multiple noise reduction paths between inlets and outlets of the device. The stacked disk assembly may be characterized as follows: 1) the stacked disk assembly has multiple pressure redaction flow paths (e.g., radial, axial and lateral flow paths) having inlets at a hollow center and outlets at an outer perimeter that are offset from a radial direction and are defined by more than at least two pressure reduction stages coupled in series, with each pressure reduction stage being coupled to at least one subsequent pressure reduction stage in an adjacent annular disk; and 2) each stage includes one or more apertures where the inner or first and second stage apertures have well-rounded or well-tapered inlets and an abrupt discharge and the outer stage, or third or fourth stages, have restrictions that provide a predetermined back pressure to control the fluid velocities at the exterior of the device to maintain subsonic flow and discharge at a predetermined angle to shift peak frequencies that may be in the audible range.

Figure 1:
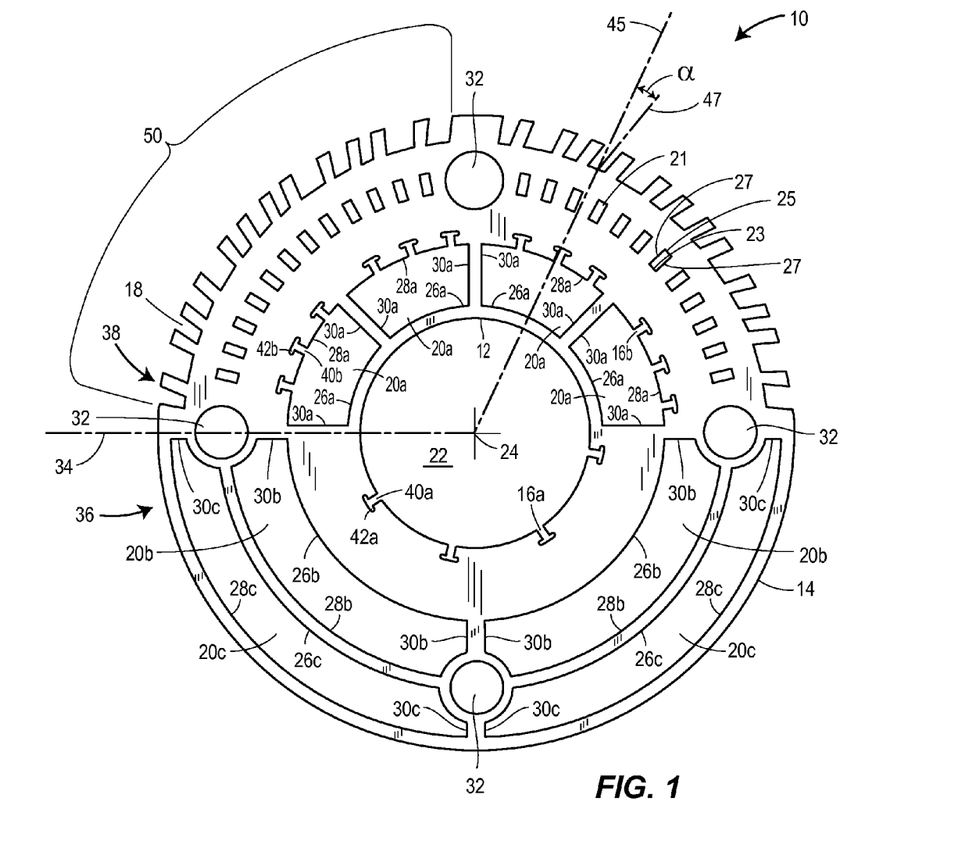
FIG. 1 is a top view of an embodiment of a stackable noise attenuating disk.

As illustrated in FIG. 1, an example stackable noise attenuating disk 10 includes an inner perimeter edge 12 and an outer perimeter edge 14. A plurality of first inlet passages 16a are disposed along the inner perimeter edge 12 and a plurality of outlet passages 18 are disposed along the outer perimeter edge 14. Fluid entering at least one of the inlet passages 16a passes into one of a plurality of first plenum sections 20a of one or more adjacent disks creating a first stage. The fluid then exits first plenum sections 20a through at least one of a plurality of second inlet passages 16b of first plenum sections 20a into one of a plurality of second plenum sections 20b of one or more adjacent disks creating a second stage. Fluid from second plenum sections 20b passes into third plenum sections 20c through a plurality of apertures 21 of one or more adjacent disks creating a third stage. From the third plenum sections 20c the fluid exits through one or more of the outlet passages 18. The outlet passages 18 cooperate to shift the peak noise frequencies of fluid exiting the plurality of outlet passages 18, thereby reducing the overall noise level in the audio range of fluid exiting the plurality of outlet passages. Additionally, in accordance with the principles of the present invention, there is provided a noise reduction device which includes at least two stacked disks each having fluid passageways for communicating fluid from an inlet to an outlet. It should be evident to those skilled in the art that embodiments with four to six stages (or more than seven) and more than two disks are deducible from the teachings of this invention. Further, an assembly of stacked disks in fluid communication as described herein provides radial, lateral, and axial fluid flow within the assembly.

Continuing, disk 10 may be substantially planar having first and second opposing planar surfaces, may have a substantially annular shape, and may be made from a metal, metal alloy, or any suitable material. More specifically, disk 10 may be defined by an inner perimeter edge 12 that defines a central aperture 22. The inner perimeter edge 12 may be circular or substantially circular in shape, thereby defining a circular central aperture 22. The disk 10 may be further defined by an outer perimeter edge 14 that may be circular in shape and the circular outer perimeter edge 14 and circular inner perimeter edge 12 may be concentric about a shared center point 24.

Disk 10 also includes a plurality of first plenum sections 20a, a plurality of second plenum sections 20b, and a plurality of third plenum sections 20c, with each subsequent plenum section having a radial displacement or offset, relative to central aperture 22, greater than the prior plenum section, as described in greater detail below. First plenum sections 20a are disposed adjacent inner perimeter edge 12 and may be at least radially defined by inner edges 26a and outer edges 28a and may be laterally defined by end walls 30a that extend in a radial direction between inner edge 26a and outer edge 28a. End walls 30a on the outside of each of the outermost first plenum sections 20a may each be slightly offset from a centerline 34 that passes through a center point 24 of disk 10 and centerline 34 may divide the disk into a first disk portion 36 and a second disk portion 38, with first plenum sections 20a formed in second disk portion 38.

Second plenum sections 20b are formed in first disk portion 36 and may be at least radially defined by inner edges 26b and outer edges 28b, which will be described in more detail below. Second plenum sections 20b may be laterally defined by end walls 30b. End walls 30b may each have a rectilinear first portion that extends in a radial direction from inner edge 26b and an arcuate second portion that extends around holes 32 and to outer edge 28b. The first portion of end walls 30b on the outside of each of the outermost second plenum sections 20b may each be slightly offset from centerline 34.

Third plenum sections 20c are formed in first disk portion 36 and may be at least radially defined by inner edges 26c and outer edges 28c. Third plenum sections 20c may also be laterally defined by end walls 30c. End walls 30c each have an arcuate first portion that extends around holes 32 from inner edge 26c and a rectilinear second portion that extends radially to outer edge 28c. The second portion of end walls 30c on the outside of each of the outermost third plenum sections 20c may each be slightly offset from centerline 34.

Apertures 21 are formed in second disk portion 38 and are positioned radially about center point 24 between first plenum sections 20a and outlet passages 18. Apertures 21 may be defined by inner edges 23 that are radially disposed from second inlet passages 16b. Outer edges 25 and inner edges 23 radially define apertures 21. Inner edges 23 are radially disposed from second inlet passages 16b such that apertures 21 are in fluid communication with a second plenum section 20b of at least one adjacent disk 10 when a plurality of disks 10 are vertically stacked. Similarly, outer edges 25 are radially disposed from outlet passages 18 such that apertures 21 are in fluid communication with a third plenum section 20c of at least one adjacent disk 10 when a plurality of disks 10 are vertically stacked. Apertures 21 may be laterally defined by side walls 27 that extend in a radial direction between inner edge 23 and outer edge 25. In the example shown, apertures 21 are generally rectangular in shape, however, could be any other suitable shape, such as square, triangular, circular, oval, etc., as desired.

As discussed above, the plurality of first inlet passages 16a are disposed along the inner perimeter edge 12 of central aperture 22 and the plurality of second inlet passages 16b are disposed along the outer edges 28a of first plenum sections 20a. Each of the inlet passages 16a, 16b may include a channel portion 40a, 40b that extends from inner perimeter edge 12 or outer edges 28a in a radial direction. Channel portions 40a, 40b intersect slot portions 42 that are perpendicular to channel portions 40a, 40b such that the inlet passages 16a, 16b form a "rounded T" shape. The plurality of inlet passages 16a may be disposed at any suitable location (e.g., at 45 degrees relative to each other) along the circumference of inner perimeter edge 12 and the plurality of inlet passages 16b may be disposed at any suitable locations (e.g., at 24 degrees relative to each other) along outer edges 28a of first plenum sections 20a. For example, as illustrated in FIG. 1, inlet passages 16a may be disposed only along the portion of inner perimeter edge 12 included in first disk portion 36. Adjacent inlet passages 16a, 16b may have any suitable spacing. Additionally, adjacent inlet passages 16a, 16b may be uniformly spaced as illustrated in FIG. 1. Slot portions 42a may be outwardly spaced from inner perimeter edge 12 such that slot portions 42a are in fluid communication with a first plenum section 20a of at least one adjacent disk 10 when a plurality of disks 10 are vertically stacked in the manner discussed in detail below. Similarly, slot portions 42b may be outwardly spaced from outer edges 28a such that slot portions 42b are in fluid communication with a second plenum section 20b of at least one adjacent disk 10 when a plurality of disks 10 are vertically stacked.

Figure 2:
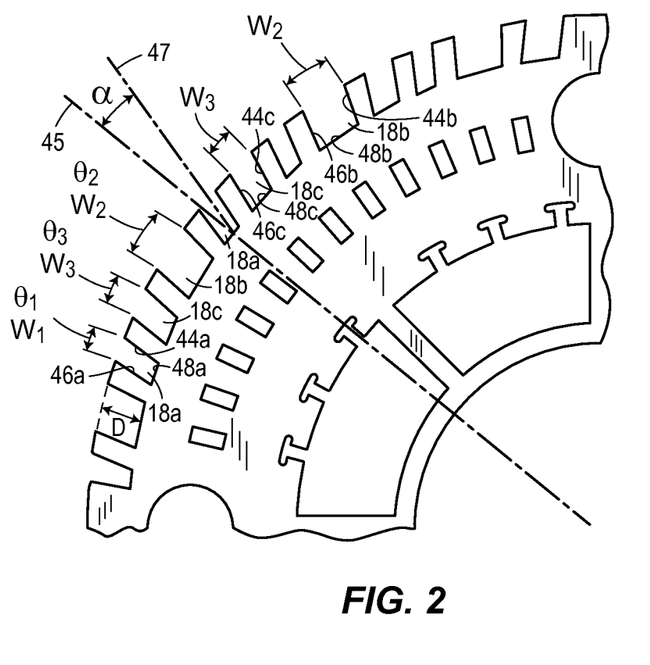
FIG. 2 is a partial top view of the embodiment of the stackable noise attenuating disk of FIG. 1.

Referring to FIGS. 1 and 2, outlet passages 18 are disposed along outer perimeter edge 14 of disk 10 and may be disposed at any suitable location along the circumference of outer perimeter edge 14. For example, as illustrated in FIG. 1, outlet passages 18 may be disposed only along the portion of the outer perimeter edge 14 included in second disk portion 38. In the example shown, a longitudinal axis 47 of each of the outlet passages 18 is offset in the same direction a predetermined angle $\alpha$ from a radial axis 45 extending from center point 24 through each outlet passage 18. The angle $\alpha$ in which the longitudinal axis 47 of each of the outlet passages is offset from a corresponding radial axis 45 is preferably 15°, but can be in a range of 10° thru 35°. The angular offset of the outlet passages 18 from the radial direction allows alternating rows of outlet passages 18 to exhaust without interference from vertically adjacent outlet passages.

Outlet passages 18 can all have the same size and shape or can have varying sizes and shapes as desired for a particular application. In the example depicted in FIGS. 1 and 2, the plurality of outlet passages 18 include a plurality of first outlet passages 18a, a plurality of second outlet passages 18b, and a plurality of third outlet passages 18c. Each of the plurality of outlet passages 18a, 18b, 18c may include a first lateral edge 44a, 44b, 44c and a second lateral edge 46a, 46b, 46c that each inwardly extend from the outer perimeter edge 14. Circumferential inner edges 48a, 48b, 48c may extend between first lateral edges 44a, 44b, 44c and second lateral edges 46a,

46*b*, 46*c* respectively, and inner edges 48*a*, 48*b*, 48*c* may have the shape of a circular arc or a straight line that is radially offset a distance D from the outer perimeter edge 14, such that the outlet passages 18*a*, 18*b*, 18*c* are in fluid communication with third plenum sections 20*c* of at least one adjacent disk 10 when a plurality of disks 10 are vertically stacked in the manner discussed below. The distance D may be the same for all of the outlet passages 18*a*, 18*b*, 18*c* or the distance D may be different for different outlet passages 18*a*, 18*b*, 18*c*.

First lateral edges 44*a* and second lateral edges 46*a* of first outlet passages 18*a* may be separated by a first width W1, which may correspond to a first angular displacement θ1. In an alternative embodiment, first lateral edges 44*a* and second lateral edges 46*a* may be parallel instead of radially disposed and, in this embodiment, the first width W1 is the rectilinear distance between first lateral edge 44*a* and second lateral edge 46*a*. In addition, in this embodiment, first lateral edges 44*a* and second lateral edges 46*a* would extend parallel to the longitudinal axis 47 of the corresponding outlet passage 18 and would also be offset a predetermined angle α from the corresponding radial axis 45.

First lateral edges 44*b* and second lateral edges 46*b* of second outlet passage 18*b* may be separated by a second width W2 that is greater than first width W1. Second width W2 may correspond to a second angular displacement θ2, that is also greater than first angular displacement θ1. In an alternative embodiment, first lateral edges 44*b* and second lateral edges 46*b* may be parallel instead of radially disposed and, in this embodiment, the second width W2 is the rectilinear distance between the second lateral edge 44*b* and second lateral edge 46*b*. In addition, in this embodiment, first lateral edges 44*b* and second lateral edges 46*b* would extend parallel to the longitudinal axis 47 of the corresponding outlet passage 18 and would also be offset a predetermined angle α from the corresponding radial axis 45.

First lateral edges 44*c* and second lateral edges 46*c* of third outlet passage 18*c* may be separated by a third width W3, that is greater than second width W2. Third width W3 may correspond to a third angular displacement θ3, that is also greater than second angular displacement θ2. In an alternative embodiment, first lateral edges 44*c* and second lateral edges 46*c* may be parallel instead of radially disposed and, in this embodiment, the third width W3 is the rectilinear distance between the second lateral edge 44*c* and second lateral edge 46*c*. In addition, in this embodiment, first lateral edges 44*c* and second lateral edges 46*c* would extend parallel to the longitudinal axis 47 of the corresponding outlet passage 18 and would also be offset a predetermined angle α from the corresponding radial axis 45.

Although the example shown uses outlet passages having three different sizes, any number of different sizes (e.g., two, four, five, six, etc.) can be used. The use of outlet passages 18 having varying sizes (e.g., first outlet passages 18*a*, second outlet passages 18*b*, and third outlet passages 18*c*) provides a greater level of noise reduction than disks having outlet sizes of uniform width. The outlet passages having non-uniform widths develop substantially non-uniform outlet jet lengths, which prevents the sound energy at the outlet passages from being released at the same peak frequency. The resulting shift or dispersal of outlet peak frequencies lowers the overall trim noise level.

First outlet passages 18*a*, second outlet passages 18*b*, and third outlet passages 18*c* may be arranged in any configuration desired. For example, outlet passages 18*a*, 18*b*, 18*c* may alternate in position such that each first outlet passage 18*a* is adjacent to a second outlet passage 18*b* and a third outlet passage 18*c*, each second outlet passage 18*b* is adjacent to a first outlet passage 18*a* and a third outlet passage 18*c*, and each third outlet passage 18*c* is adjacent to a first outlet passage 18*a* and a second outlet passage 18*c* (e.g., 18*a*, 18*b*, 18*c*, 18*a*, 18*b*, 18*c*, 18*a*, 18*b*, 18*c*). Alternatively, outlet passages can be arranged to increase from small to large and decrease from large to small such that each third outlet passage 18*c* is adjacent two second outlet passages 18*b*, each first outlet passage 18*a* is adjacent two second outlet passages 18*b*, and each second outlet passage 18*b* is adjacent a first outlet passage 18*a* and a third outlet passage 18*c* (e.g., 18*a*, 18*b*, 18*c*, 18*b*, 18*a*, 18*b*, 18*c*, 18*b*, 18*a*).

In FIGS. 1 and 2, outlet passages 18*a*, 18*b*, 18*c* are disposed along outer perimeter edge 14 in discrete outlet groups 50, which may include any suitable number of outlet passages 18*a*, outlet passages 18*b*, and outlet passages 18*c*. In the example shown, each outlet group 50 may include four first outlet passages 18*a*, five second outlet passages 18*b*, and four third outlet passages 18*c*. Each outlet group 50 is arranged with one second outlet passage 18*b* in the center. Moving out in opposite directions from the center second outlet passage 18*b*, a first outlet passage 18*a* is located on either side of the center second outlet passage 18*b*, a third outlet passage 18*c* is located outside each first outlet passage 18*a*, a second outlet passage 18*b* is located outside each third outlet passage 18*c*, a first outlet passage 18*a* is located outside each second outlet passage 18*b*, a third outlet passage 18*c* is located outside each first outlet passage 18*a*, and a second outlet passage 18*b* is located outside each third outlet passage 18*c* (e.g., 18*b*, 18*c*, 18*a*, 18*b*, 18*c*, 18*a*, 18*b*, 18*a*, 18*c*, 18*b*, 18*a*, 18*c*, 18*b*).

Instead of having only a plurality of first outlet passages 18*a*, second outlet passages 18*b*, and third outlet passages 18*c*, the plurality of outlet passages 18 may include any number of differently sized outlet passages 18. For example, the plurality of outlet passages 18 may include one or more fourth outlet passages, fifth outlet passages, or any further number of outlet passages. The fourth outlet passages may be identical to the third outlet passages 18*c* described above, with the exception that the first lateral edges and second lateral edges of the fourth outlet passages may be separated by a fourth width, which may be a fourth angular displacement that is greater than third angular displacement θ3. Alternatively, the fourth width may be the rectilinear distance between the first lateral edge and second lateral edge and the fourth width is greater than the third width W3. Fifth outlet passages may also be identical to the third outlet passages 18*c* described above, with the exception that the first lateral edge and second lateral edge of the fifth outlet passage may be separated by a fifth width, which may be a fifth angular displacement that is greater than the fourth angular displacement. Alternatively, the fifth width may be the rectilinear distance between the first lateral edge and the second lateral edge and the fifth width is greater than the fourth width. One having ordinary skill in the art would recognize that a sixth outlet passage having a sixth width, a seventh outlet passage having a seventh width, and an eighth outlet passage having an eighth width, etc., are contemplated. The sixth width may be greater than the fifth width, the seventh width may be greater than the sixth width, and the eighth width may be greater than the seventh width W7, and so on. The one or more fourth outlet passages, fifth outlet passages, sixth outlet passages, etc., may be disposed at any position relative to the first, second, and third outlet passages 18*a*, 18*b*, 18*c*. In addition, if the plurality of outlet passages 18 are arranged in a plurality of outlet groups 50, one or more of the fourth outlet passages, fifth outlet passages, sixth outlet passages, etc., may be included in any or all of plurality of outlet groups 50.

Figure 3:
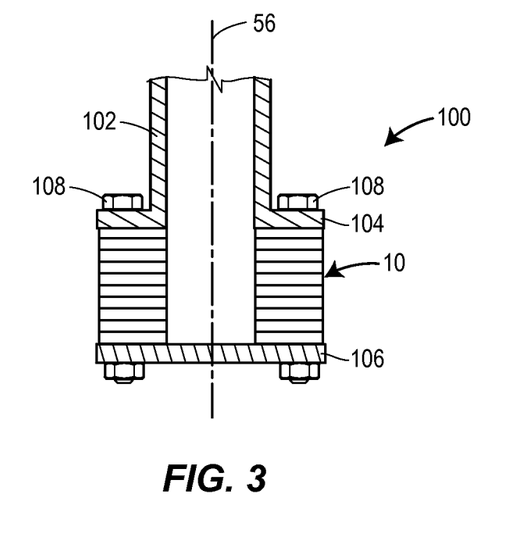
FIG. 3 is a partial sectional side view of a vent diffuser that includes a stack of disks, with each disk being the embodiment of the disk illustrated in FIG. 1.
Figure 4:
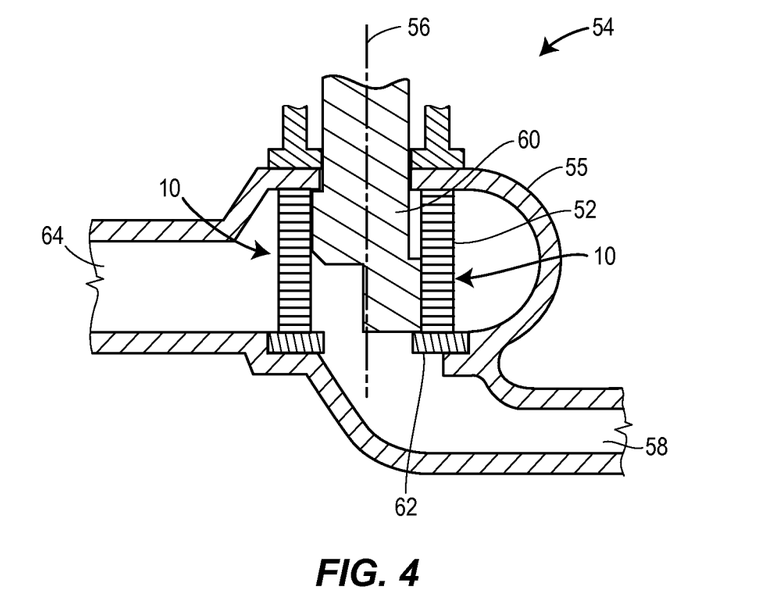
FIG. 4 is a partial sectional side view of a control valve that includes a stack of disks, with each disk being the embodiment of the disk illustrated in FIG. 1.
Figure 5:
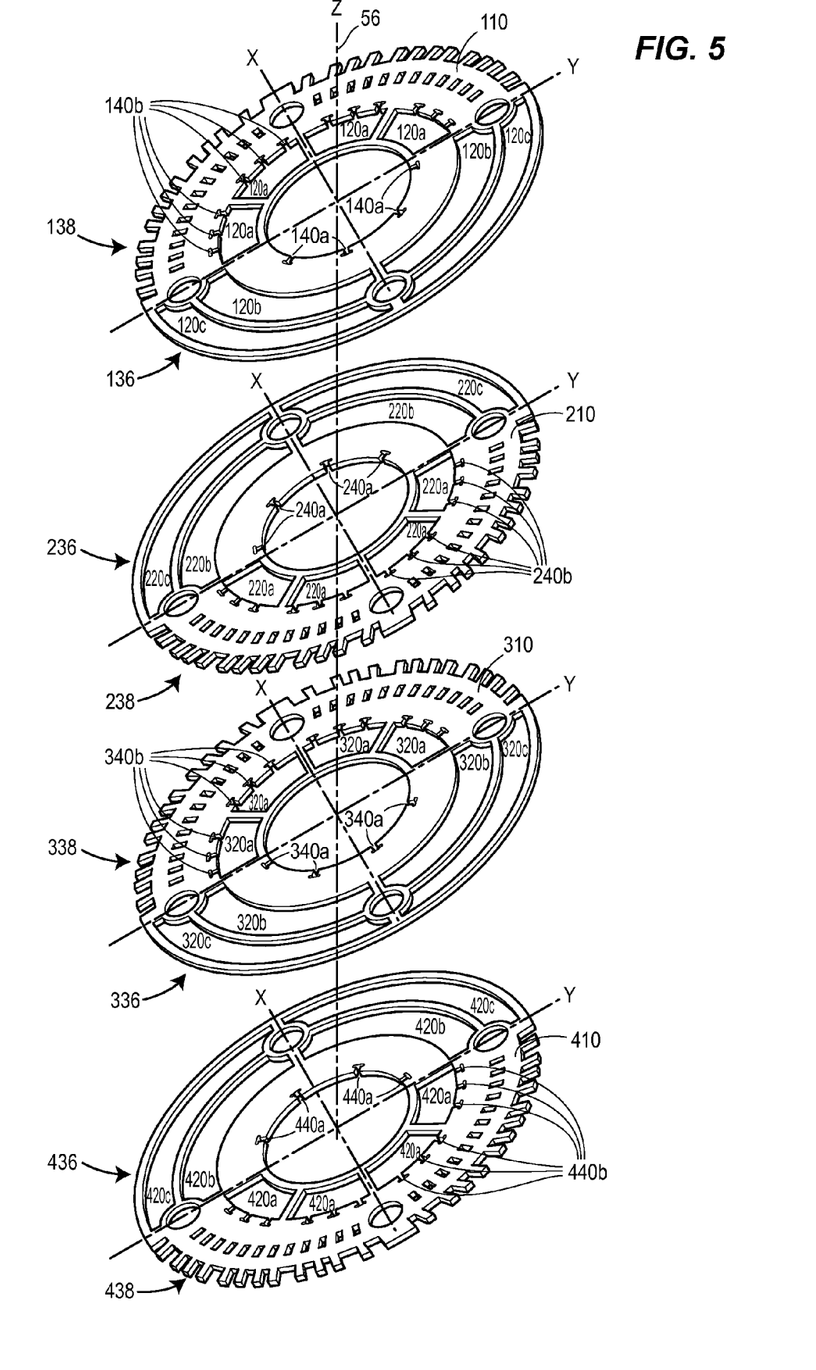
FIG. 5 is an exploded perspective view of a stack of disks, with each disk being the embodiment of the disk illustrated in FIG. 1.

In use, a plurality of disks 10 may be stacked to form a vent diffuser 100 or a valve cage 52 for use in a control valve 54, as illustrated in FIGS. 3 and 4. A plurality of holes 32 may be formed in each of the plurality of disks 10 comprising the vent diffuser 100 or valve cage 52 such that a vertical rod or through bolt 108 (see FIG. 3) may be disposed in each of the holes 32, thereby maintaining the stack of disks 10 in vertical and horizontal alignment. The vent diffuser 100/valve cage 52 may be comprised of a stack of identical disks 10, which alternate in orientation along the vertical z axis 56. Specifically, as illustrated in the partial exploded view of FIG. 5, a preferred orientation of a four disk stack is achieved by rotating 180 degrees or "flipping" second disk 210, third disk 310, and fourth disk 410 relative to first disk 110 about the z axis 56, a horizontal x axis, and a horizontal y axis that is perpendicular to the x axis, respectively. This alternating pattern may repeat for each of the plurality of four disks 110, 210, 310, and 410 comprising the vent diffuser 100/valve cage 52 shown in FIGS. 3 and 4. However, any suitable configuration or orientation of disks is contemplated. In addition, instead of a repeating stack of identical disks, the vent diffuser 100/valve cage 52 may include two or more different disks.

Figure 6:
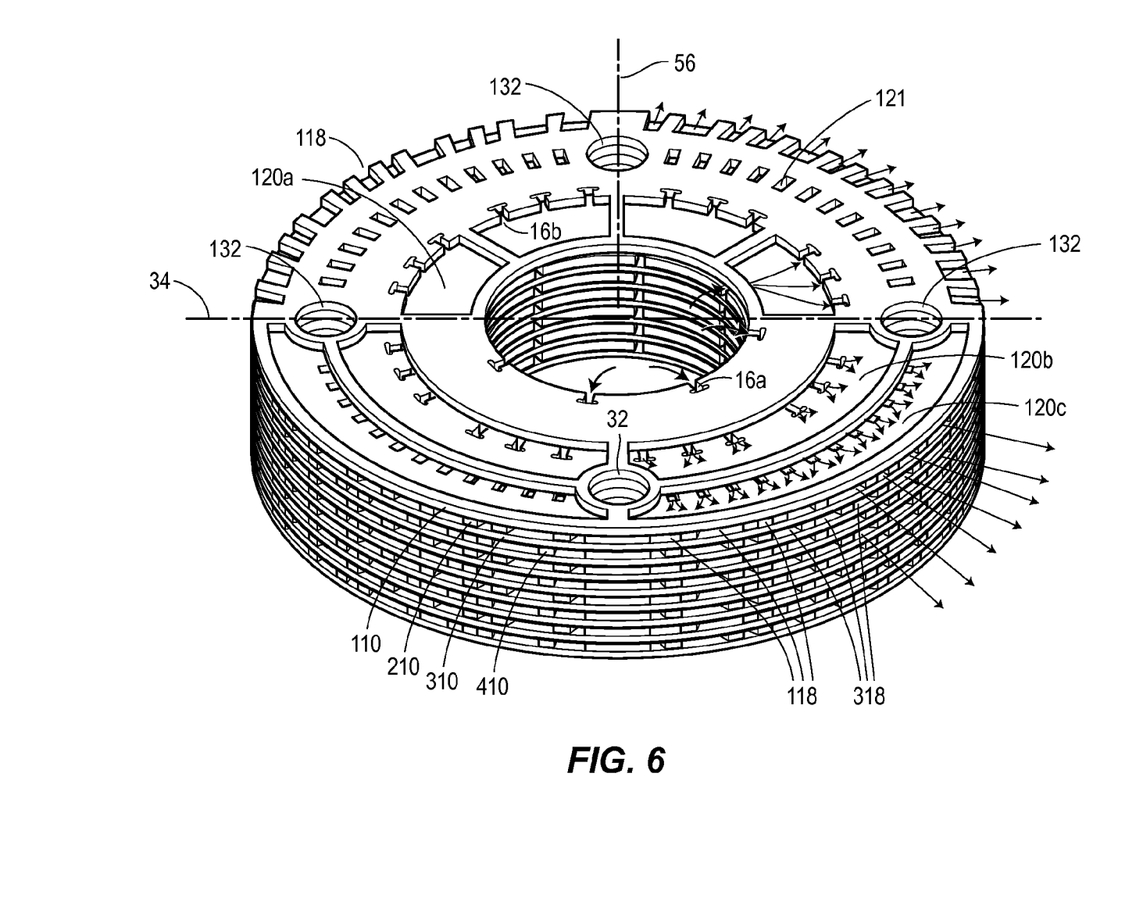
FIG. 6 is a perspective view of a stack of disks, with each disk being the embodiment of the disk illustrated in FIG. 1.

As can be seen in FIG. 6, by alternating the orientation of the disks 10 as described above, the typical vertical and circumferential alignment of outlet passages 18 in a stack of disks 10 is avoided, which provides greater vertical spacing is between outlet passages 18. As indicated by the partial flow diagram indicating radial, lateral, and axial flow, the combination of the greater vertical spacing of outlet passages and the angular offset of outlet passages 18 described above allows alternating rows of outlet passages 18 to discharge with less interference. This can reduce or eliminate any flow/pressure related tone and provide a broadband noise reduction. For example, using the example disks 10 described herein, a 3 dB broadband noise reduction can be achieved. In addition to broadband noise reduction, A-weighted levels can also be reduced.

Figure 7:
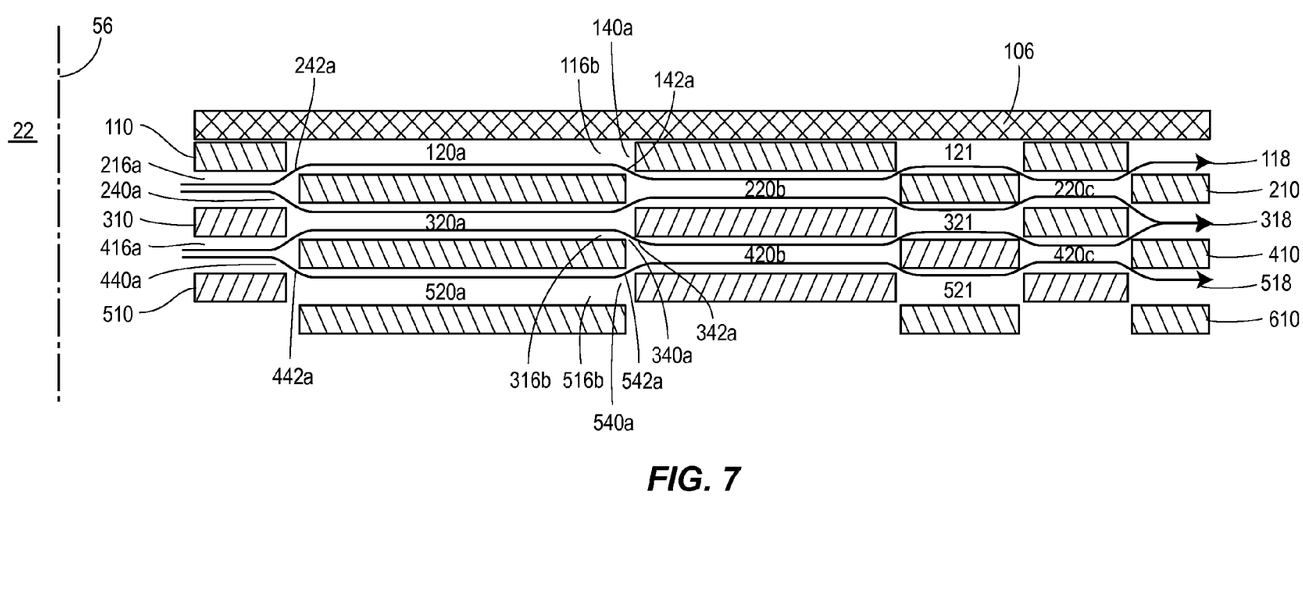
FIG. 7 is a partial side sectional view and partial flow diagram of a stack of disks, with each disk being the embodiment of the disk illustrated in FIG. 1.

An example of the flow of fluid through the vent diffuser 100/valve cage 52 is shown in more detail in FIG. 7, which is a partial cross-sectional view and a partial flow diagram of a vent diffuser 100/valve cage 52 comprising end plate 106 and disks 110, 210, 310, 410, 510, and 610. In FIG. 7, fluid enters the vent diffuser 100/valve cage 52 by entering through the aperture 22 and into channel portions 240a and 440a of inlet passage 216a and 416a of disks 210 and 410 respectively. The fluid then enters the rounded T-slot portions 242a and 442a and axially divides into adjacent plenum sections 120a, 320a, and 520a of adjacent disks 110, 310, and 510, respectively. The fluid flow then continues radially and laterally through the plenum sections 120a, 320a, and 520a into channel portions 140b, 340b, and 540b of second inlet passages 116b, 316b, and 516b of disks 110, 310, and 510, respectively. The fluid then enters rounded T-slot portions 142b, 342b, and 542b of second inlet passages 116b, 316b, and 516b and the fluid flows axially to enter second plenum sections 220b and 420b of disks 210 and 410, respectively. The fluid then continues radially and laterally through second plenum sections 220b and 420b and then axially into apertures 121, 321, and 521 of adjacent disks 110, 310, and 510, respectively. The fluid then continues radially through apertures 121, 321, and 521 and then axially into third plenum sections 220c and 420c of disks 210 and 410, respectively. The fluid then continues radially and laterally through third plenum sections 220c and 420c and then axially into outlet slots 118, 318, and 518 of adjacent disks 110, 310, and 510, respectively. The fluid flows radially through outlet slots 118, 318, and 518 and exits vent diffuser 100/valve cage 52. As explained above, fluid may exit through any or all of the outlet passages when three sizes of outlets passages are included in each of the disks. If four or more sizes of outlet passages are included in the disks, fluid may exit through any or all of the outlet passages of each of the disks.

Thus, referring again to FIG. 3, an example vent diffuser 100 may include a hollow, cylindrical pipe 102 having a neck flange 104 at a terminal end of the cylindrical pipe 102. The plurality of disks 10 may be disposed between a bottom surface of the neck flange 104 and a top surface of an impermeable, planar end plate 106. The cylindrical pipe 102, the plurality of disks 10, and the end plate 106 may be coupled by a plurality of through bolts 108 that extend through each of a plurality of axially-aligned apertures that extend through neck flange 104, holes 32 in plurality of disks 10, and axially-aligned apertures that extend through end plate 106. In this example, high pressure fluid passes from the interior of cylindrical pipe 102 into at least one of the first inlet passages 16a of disks 10. Fluid then flows from inlet passages 16 into a first plenum section 20a in an adjacent disk, through first plenum section 20a and second inlet passage 16b into a second plenum section 20b, through plenum section 20b into an aperture 21 of an adjacent disk, through aperture 21 into third plenum section 20c, and through plenum section 20c into an outlet passage 18 to exit vent diffuser 100.

And as illustrated in FIG. 4, an example control valve 54 includes a housing 55, an inlet 58 and an outlet 64 formed in housing 55, a valve seat 62 disposed within housing 55 between inlet 58 and outlet 64, and a valve plug 60 that vertically displaces from a first position in which valve plug 60 sealingly engages valve seat 62 to a second position in which valve plug 60 is remotely disposed from valve seat 60. When fluid enters inlet 58 of control valve 54 and valve plug 60 is disposed away from valve seat 62, the fluid flows through valve cage 52 comprising a plurality of disks 10 towards outlet 64. Specifically, fluid enters at least one of the first inlet passages 16a of disks 10. Fluid then flows from inlet passages 16 into a first plenum section 20a in an adjacent disk, through first plenum section 20a and second inlet passage 16b into a second plenum section 20b, through plenum section 20b into an aperture 21 of an adjacent disk, through aperture 21 into third plenum section 20c, and through plenum section 20c into an outlet passage 18 to outlet 64 of control valve 54.

The disks 10 of the disclosed vent diffuser 100 and valve cage 52, having a plurality of outlet passages 18 possessing non-uniform widths, provide a greater level of noise reduction than disks having uniform widths. Specifically, the plurality of outlet passages 18 having non-uniform widths (such as first outlet passage 18a, second outlet passage 18b, and third outlet passage 18c) cooperate to develop substantially non-uniform outlet jet lengths. The outlet jet length can be defined as the length of the plume of the fluid exiting the outlet passage. Because the outlet jet lengths are non-uniform, the sound energy at the outlet passages is not released at the same peak frequency and the resulting dispersal of outlet peak frequencies lowers the overall trim noise level.

In order to adequately shift the peak frequencies of fluid exiting the outlet passages, the difference in the flow areas of non-uniform outlet passages 18 (such as first outlet passage 18a, second outlet passage 18b, and third outlet passage 18c) must be sufficiently large. As one having ordinary skill in the art would understand, the difference in outlet flow area of outlet passages having a uniform depth is proportional to the angular or rectilinear width. It is also important that the difference in the flow areas of the outlet passages is not a direct multiple of the flow areas. Multiples of prime number percentages are recommended. However, consideration must be given such that the largest outlet passage is not too large to effectively attenuate the noise of the fluid exiting the outlet passage.

While various embodiments have been described above, this disclosure is not intended to be limited thereto. Variations can be made to the disclosed embodiments that are still within the scope of the appended claims.

What is claimed is:

1. A noise and fluid pressure reduction device, comprising:
a plurality of stacked disks comprising a first disk, a second disk, a third disk, and a fourth disk, each of the first, second, third, and fourth disks comprising;
an inner perimeter edge;
an outer perimeter edge;
a plurality of inlet passages disposed along the inner perimeter edge, the plurality of inlet passages in fluid communication with a first plenum section of an adjacent disk;
a second plenum section outwardly offset in a radial direction from the inner perimeter edge such that the second plenum section is in fluid communication with the first plenum section and an aperture of the adjacent disk;
a third plenum section offset in a radial direction from the inner perimeter edge such that the third plenum section is in fluid communication with the aperture and an outlet passage of the adjacent disk; and
a plurality of outlet passages disposed along the outer perimeter edge, the plurality of outlet passages positionable in fluid communication with a third plenum section of the adjacent disk and including a plurality of first outlet passages having a first width and a plurality of second outlet passages having a second width, greater than the first width, each of the plurality of outlet passages defining a longitudinal axis that is offset by a predetermined angle from a radial axis extending through a corresponding outlet passage;
wherein:
the second disk is positioned adjacent the first disk and is oriented such that the second disk is rotated 180 degrees about a vertical axis relative to the first disk and the plurality of outlet passages of the second disk are on an opposite side of the noise and fluid pressure reduction device from the plurality of outlet passages of the first disk;
the third disk is positioned adjacent the second disk and is oriented such that the third disk is rotated 180 degrees about a first horizontal axis relative to the first disk, the plurality of outlet passage of the third disk are on a same side of the noise and fluid pressure reduction device from the plurality of outlet passages of the first disk, and the longitudinal axes of the plurality of outlet passages of the third disk are offset from the radial axes in a direction opposite that of the plurality of outlet passages of the first disk; and
the fourth disk is positioned adjacent the third disk and is oriented such that the fourth disk is rotated 180 degrees about a second horizontal axis, perpendicular to the first horizontal axis, relative to the first disk, the plurality of outlet passage of the fourth disk are on the opposite side of the noise and fluid pressure reduction device from the plurality of outlet passages of the first disk, and the longitudinal axes of the plurality of outlet passage of the third disk are offset from the radial axes in a direction opposite that of the plurality of outlet passages of the second disk.

2. The noise and fluid pressure reduction device of claim 1, wherein the predetermined angle is 15 degrees.

3. The noise and fluid pressure reduction device of claim 1, wherein the plurality of outlet passages include a plurality of third outlet passages having a third width, greater than the second width.

4. The noise and fluid pressure reduction device of claim 3, wherein each disk includes one or more outlet groups, each of the one or more outlet groups comprising at least one first outlet passage, at least one second outlet passage, and at least one third outlet passage.

5. The noise and fluid pressure reduction device of claim 1, wherein:
each of the plurality of first outlet passages and the plurality of second outlet passages are defined by a first lateral edge, a second lateral edge, and a circumferential inner edge; and
the first lateral edge and the second lateral edge of each of the plurality of first outlet passages and the plurality of second outlet passages have the same length.

6. The noise and fluid pressure reduction device of claim 5, wherein the first lateral edge and the second lateral edge of each of the plurality of first outlet passages and the plurality of second outlet passages are parallel to the corresponding longitudinal axis.

7. The noise and fluid pressure reduction device of claim 5, wherein:
the first lateral edge and the second lateral edge of each of the plurality of first outlet passages is separated by a first angular dimension and the first angular dimension is the first width; and
the first lateral edge and the second lateral edge of each of the plurality of second outlet passages is separated by a second angular dimension and the second angular dimension is the second width.

8. The noise and fluid pressure reduction device of claim 1, wherein the plurality of first outlet passages and the plurality of second outlet passages cooperate to shift the noise peak frequencies of fluid exiting the plurality of outlet passages, thereby reducing the overall noise level of fluid exiting the plurality of outlet passages.

9. The noise and fluid pressure reduction device of claim 1, wherein each of the first, second, third, and fourth disks further comprises:
a first plenum section positioned adjacent the inner perimeter edge and outwardly offset in a radial direction from the inner perimeter edge such that the first plenum section is in fluid communication with at least one inlet passage of the adjacent noise attenuating disk; and
an aperture outwardly offset in a radial direction from the first plenum section such that the aperture is in fluid communication with a second plenum section of the adjacent noise attenuating disk.

10. The noise and fluid pressure reduction device of claim 9, wherein fluid entering at least one of the plurality of inlet passages flows through the first plenum section of the adjacent noise attenuating disk, through the second plenum section, through the aperture of the adjacent noise attenuating disk, and through the third plenum section, to exit through the outlet passage of the adjacent noise attenuating disk.

11. The noise and fluid pressure reduction device of claim 9, wherein fluid entering the inlet passage of the adjacent noise attenuating disk flows through the first plenum section, through the second plenum section of the adjacent noise attenuating disk, through the aperture, and through the third plenum section of the adjacent noise attenuating disk, to exit through at least one of the plurality of outlet passages.

12. The noise and fluid pressure reduction device of claim 9, wherein each of the first, second, third, and fourth disks further comprises at least one second inlet passage extending from an outer edge of the first plenum section to provide the fluid communication between the first plenum section and the second plenum section of the adjacent noise attenuating disk.

13. The noise and fluid pressure reduction device of claim 9, wherein:
the plurality of inlet passages are positioned in a first disk portion, located on one side of a centerline of the stackable noise attenuating disk; and
the plurality of outlet passages are positioned in a second disk portion, located on an opposite side of the centerline.

14. A vent diffuser, comprising:
an elongated hollow pipe having a flange at one end of the pipe;
an impermeable end plate coupled to the flange; and
a plurality of stacked disks disposed between the flange and the end plate, the plurality of stacked disks comprising a first disk, a second disk, a third disk, and a fourth disk, each of the first, second, third, and fourth disks comprising:
an inner perimeter edge;
an outer perimeter edge;
a plurality of inlet passages disposed along the inner perimeter edge, the plurality of inlet passages positionable in fluid communication with a first plenum section of an adjacent disk of the plurality of stacked disks;
a second plenum section outwardly offset in a radial direction from the inner perimeter edge such that the second plenum section is positionable in fluid communication with the first plenum section and an aperture of the adjacent disk;
a third plenum section offset in a radial direction from the inner perimeter edge such that the third plenum section is positionable in fluid communication with the aperture and an outlet passage of the adjacent disk; and
a plurality of outlet passages disposed along the outer perimeter edge, the plurality of outlet passages positionable in fluid communication with a third plenum section of the adjacent disk and including a plurality of first outlet passages having a first width and a plurality of second outlet passages having a second width, greater than the first width, each of the plurality of outlet passages defining a longitudinal axis that is offset by a predetermined angle from a radial axis extending through a corresponding outlet passage; wherein
the second disk is positioned adjacent the first disk and is oriented such that the second disk is rotated 180 degrees about a vertical axis relative to the first disk and the plurality of outlet passages of the second disk are on an opposite side of the noise and fluid pressure reduction device from the plurality of outlet passages of the first disk;
the third disk is positioned adjacent the second disk and is oriented such that the third disk is rotated 180 degrees about a first horizontal axis relative to the first disk, the plurality of outlet passage of the third disk are on a same side of the noise and fluid pressure reduction device from the plurality of outlet passages of the first disk, and the longitudinal axes of the plurality of outlet passages of the third disk are offset from the radial axes in a direction opposite that of the plurality of outlet passages of the first disk; and
the fourth disk is positioned adjacent the third disk and is oriented such that the fourth disk is rotated 180 degrees about a second horizontal axis, perpendicular to the first horizontal axis, relative to the first disk, the plurality of outlet passage of the fourth disk are on the opposite side of the noise and fluid pressure reduction device from the plurality of outlet passages of the first disk, and the longitudinal axes of the plurality of outlet passage of the third disk are offset from the radial axes in a direction opposite that of the plurality of outlet passages of the second disk.

15. The vent diffuser of claim 14, wherein the plurality of outlet passages include a plurality of third outlet passages having a third width, greater than the second width.

16. The vent diffuser of claim 14, wherein:
each of the plurality of first outlet passages and the plurality of second outlet passages are defined by a first lateral edge, a second lateral edge, and a circumferential inner edge; and
the first lateral edge and the second lateral edge of each of the plurality of first outlet passages and the plurality of second outlet passages have the same length.

17. The vent diffuser of claim 14, wherein each of the first, second, third, and fourth disks further comprises:
a first plenum section positioned adjacent the inner perimeter edge and outwardly offset in a radial direction from the inner perimeter edge such that the first plenum section is in fluid communication with at least one inlet passage of the adjacent disk; and
an aperture outwardly offset in a radial direction from the first plenum section such that the aperture is in fluid communication with a second plenum section of the adjacent disk.

18. The vent diffuser of claim 14, wherein:
the plurality of inlet passages are positioned in a first disk portion, located on one side of a centerline of each of the stacked disks; and
the plurality of outlet passages are positioned in a second disk portion, located on an opposite side of the centerline.

19. A control valve, comprising:
a housing having an inlet and an outlet;
a valve seat disposed within the housing between the inlet and the outlet;
a valve plug vertically displaceable from a first position in which the valve plug sealingly engages the valve seat to a second position in which the valve plug is remotely disposed from the valve seat; and
a valve cage disposed within the housing adjacent to the valve seat such that the valve cage surrounds the valve plug, the valve cage comprising a plurality of stacked disks, the plurality of stacked disks comprising a first disk, a second disk, a third disk, and a fourth disk, each of the first, second, third, and fourth disks comprising:
an inner perimeter edge;
an outer perimeter edge;
a plurality of inlet passages disposed along the inner perimeter edge, the plurality of inlet passages positionable in fluid communication with a first plenum section of an adjacent disk of the plurality of stacked disks;
a second plenum section outwardly offset in a radial direction from the inner perimeter edge such that the second plenum section is positionable in fluid communication with the first plenum section and an aperture of the adjacent disk;

a third plenum section offset in a radial direction from the inner perimeter edge such that the third plenum section is positionable in fluid communication with the aperture and an outlet passage of the adjacent disk; and a plurality of outlet passages disposed along the outer perimeter edge, the plurality of outlet passages positionable in fluid communication with a third plenum section of the adjacent disk and including a plurality of first outlet passages having a first width and a plurality of second outlet passages having a second width, greater than the first width, each of the plurality of outlet passages defining a longitudinal axis that is offset by a predetermined angle from a radial axis extending through a corresponding outlet passage; wherein the second disk is positioned adjacent the first disk and is oriented such that the second disk is rotated 180 degrees about a vertical axis relative to the first disk and the plurality of outlet passages of the second disk are on an opposite side of the noise and fluid pressure reduction device from the plurality of outlet passages of the first disk;

the third disk is positioned adjacent the second disk and is oriented such that the third disk is rotated 180 degrees about a first horizontal axis relative to the first disk, the plurality of outlet passage of the third disk are on a same side of the noise and fluid pressure reduction device from the plurality of outlet passages of the first disk, and the longitudinal axes of the plurality of outlet passages of the third disk are offset from the radial axes in a direction opposite that of the plurality of outlet passages of the first disk; and the fourth disk is positioned adjacent the third disk and is oriented such that the fourth disk is rotated 180 degrees about a second horizontal axis, perpendicular to the first horizontal axis, relative to the first disk, the plurality of outlet passage of the fourth disk are on the opposite side of the noise and fluid pressure reduction device from the plurality of outlet passages of the first disk, and the longitudinal axes of the plurality of outlet passage of the third disk are offset from the radial axes in a direction opposite that of the plurality of outlet passages of the second disk.

20. The control valve of claim 19, wherein:

the plurality of outlet passages includes a plurality of third outlet passages having a third width, greater than the second width;

each of the plurality of first outlet passages, the plurality of second outlet passages, and the plurality of third outlet passages are defined by a first lateral edge, a second lateral edge, and a circumferential inner edge; and the first lateral edge and the second lateral edge of each of the plurality of first outlet passages, the plurality of second outlet passages, and the plurality of third outlet passages have the same length.

21. The control valve of claim 19, wherein:

the plurality of inlet passages are positioned in a first disk portion, located on one side of a centerline of each of the stacked disks; and the plurality of outlet passages are positioned in a second disk portion, located on an opposite side of the centerline.

* * * * *